UNITED STATES PATENT OFFICE 2,449,798

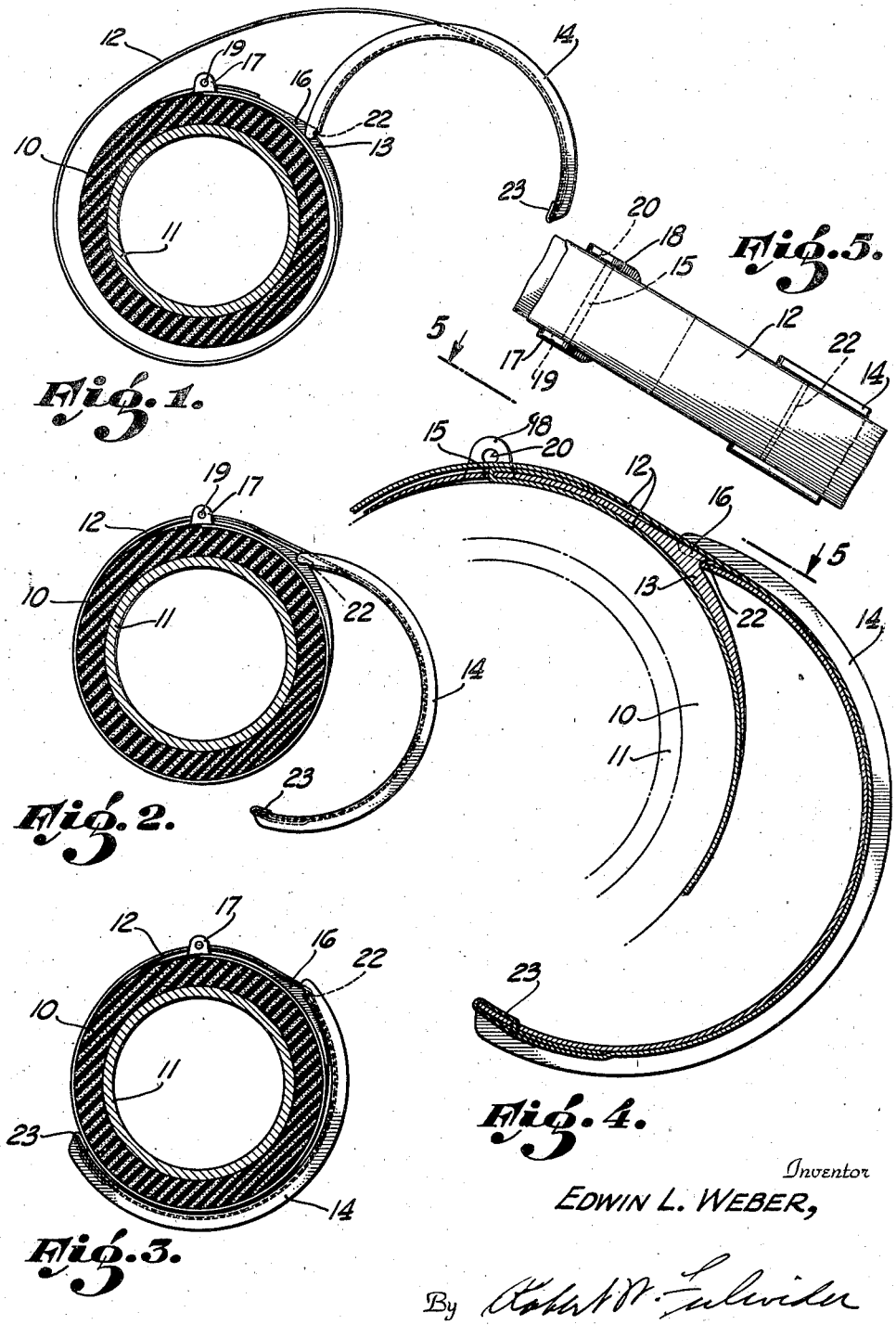

HOSE CLAMP

Edwin L. Weber, Venice, Calif.

Application October 18, 1943, Serial No. 506,682

5 Claims. (Cl. 24—19)

My invention relates generally to clamps, and particularly to clamps adapted to tightly clamp a hose or other flexible tube to a pipe or the like. This application is a continuation-in-part of my co-pending application Serial No. 448,145, filed June 23, 1942, now abandoned.

An object of my invention is to provide a novel clamp which can be easily attached or detached by hand and which will effectively clamp a hose or the like to a pipe or tube.

Another object of my invention is to provide a novel clamp which entirely encircles the hose or other object being clamped and which can be repeatedly attached and released without affecting the utility of the clamp.

It is also an object of my invention to provide a clamp of the character stated which may be adjusted to fit hoses of various diameters and which will be simple and easy to operate.

Still another object of my invention is to provide a novel clamp of the character stated which is simple in construction, inexpensive to manufacture, and effective in operation.

These and other objects and advantages of my invention will appear from the following description of a preferred form thereof and from the accompanying drawing in which:

Fig. 1 is an end view of a clamp embodying my invention in position on a hose at the start of the clamping operation, Fig. 2 is a view similar to Fig. 1 showing the clamping operation about one-half completed, Fig. 3 is another view similar to Fig. 1 with the clamping operation fully completed, Fig. 4 is an enlarged fragmentary cross-section substantially corresponding to Fig. 2, and Fig. 5 is a fragmentary plan taken on the line 5—5 of Fig. 4.

Referring now to the drawings, the numeral 10 indicates a hose or other flexible tube which is to be clamped onto a pipe 11. The clamp of my invention comprises essentially three parts, a flexible strap 12, an arcuate saddle 13 which may be formed integrally with one end of the strap, and an arcuate clamping arm 14 attached to the other end of the strap 12. The strap 12 is adapted to wrap around the hose 10, and while as mentioned, it may be made integral with the saddle 13 by spot welding or the like, I prefer to attach it to the saddle by providing a slot 15 in the saddle and passing the strap up through the slot and back over the upper face thereof, as seen best in Fig. 4. The outer face of the saddle is provided with a lug 16 forming a fulcrum against which the inner end 22 of the arcuate clamping arm 14 is placed for pivotal movement. The outer end of the strap 12 may be fastened to the outer end 23 of the clamping arm 14 in any suitable manner, but I prefer to curve it around the end of the arm and secure it in a slot on the inner face thereof. A pair of guiding ears 17 and 18 provided with holes 19 and 20, respectively, may be attached to the saddle 13 to guide the strap thereacross and also to provide means for sealing the clamp if desired.

The inside radius of the arcuate clamping arm 14 is slightly less than the outside radius of the hose 10, and as seen from the drawing, the clamping arm extends somewhat over 180° around the tube, that is to say, it is somewhat longer than one-half the circumference of the tube. All of the parts are preferably made of metal, so as to give them a desired amount of resilience and so that they will easily conform to the curvature of the hose being clamped.

In the operation of my device, the saddle 13 is placed upon the outer face of the hose 10, and the strap 12 is wrapped around the hose and back over the fulcrum portion of the saddle, being guided into proper position by the ears 17 and 18. The inner end 22 of the clamping arm 14 is placed against the lug 16, and the arm 14 is rotated inwardly toward the tube with the lug 16 acting as a pivot or fulcrum. The lever arm of the closing force being exerted on the outer end 23 of the clamping arm 14 remains constant throughout the closing operation, but the effective lever arm of the force resisting the clamping movement becomes shorter as the clamping arm 14 is closed and the strap approaches the fulcrum 16, thus facilitating the clamping operation.

Because the radius of the clamping arm 14 is less than that of the hose, the outer end 23 of the clamping arm will engage the underlying portion of the strap 12 before it reaches a point diametrically opposite the fulcrum 16. However, further pressure on the arm 14 causes it to flex and pushes it around to closed position in frictional contact with the underlying strap 12, with its free or outer end 23 more than 180° around from the fulcrum point 16. Due to the fact that the effective lever arm of the resistant force is practically zero when the strap is completely wrapped around the tube, the frictional resistance between the outer end 23 of the clamping arm 14 and the underlying portion of the strap 12 which it engages is sufficient to retain the arm in clamped position.

As will be noted, the clamping arm 14 is preferably made channel-shaped for extra strength, and due to the fact that it is solid throughout its length, the strap 12 is caused to continually overlie the arcuate arm 14 and also overlies the fulcrum 16. This arrangement which is just the opposite from conventional eccentric clamps has proved to be very advantageous in reducing the force necessary to close the clamp, even when a very close fit and extremely high clamping pressures are desired. Furthermore, it will be observed that by the clamp of my invention I secure substantially uniform pressure around the entire circumference of the hose, thus overcoming the principal objection present in conventional clamps being used today. Another advantage of my clamp is that it can be wrapped around a hose, and need not be slipped on over the end, as is the case in many other clamps now on the market.

It is to be understood of course that while I have illustrated one form of my invention in considerable detail, that I do not mean to be limited to the construction shown, but rather intend that my invention shall be accorded the full scope of the appended claims.

I claim:

1. A clamp of the character described which includes: an elongated flexible strap adapted to wrap around the article to be clamped; an arcuate saddle attached to the inner end of said strap and having a portion adapted to act as a fulcrum; and an arcuate clamping arm underlying and supporting said strap having its outer end attached to the outer end of said strap, and its inner end adapted to seat on the fulcrum of said saddle, whereby said clamping arm may be rotated inwardly about said fulcrum to draw and retain said strap over said fulcrum and said arm along the entire length of the latter and about said article being clamped.

2. A clamp of the character described which includes: an elongated flexible strap adapted to wrap around the article to be clamped; an arcuate saddle attached to the inner end of said strap and having a portion adapted to act as a fulcrum; and an arcuate clamping arm underlying and supporting said strap having its outer end attached to the outer end of said strap, and its inner end adapted to seat on the fulcrum of said saddle, the radius of curvature of said arm being slightly less than that of the article being clamped, and the length of said arm being more than one-half the circumference of said article, whereby said clamping arm may be rotated inwardly about said fulcrum to draw and frictionally retain said strap over said fulcrum and said arm along the entire length of the latter and about said article being clamped.

3. A clamp of the character described which includes: an elongated flexible strap adapted to wrap around the article to be clamped; an arcuate saddle attached to the inner end of said strap and provided with a lug on its outer face forming a fulcrum; and an arcuate clamping arm underlying and supporting said strap having its outer end attached to the outer end of said strap, and its inner end adapted to seat on the fulcrum of said saddle, whereby said clamping arm may be rotated inwardly about said fulcrum to draw and retain said strap over said fulcrum and said arm along the entire length of the latter and about said article being clamped.

4. A clamp of the character described which includes: an elongated flexible strap adapted to wrap around the article to be clamped; an arcuate saddle attached to the inner end of said strap and provided with a lug on its outer face forming a fulcrum; and an arcuate clamping arm underlying and supporting said strap having its outer end attached to the outer end of said strap, and its inner end adapted to seat on the fulcrum of said saddle, the radius of curvature of said arm being slightly less than that of the article being clamped, and the length of said arm being more than one-half the circumference of said article, whereby said clamping arm may be rotated inwardly about said fulcrum to draw and frictionally retain said strap over said fulcrum and said arm along the entire length of the latter and about said article being clamped.

5. A clamp of the character described which includes: an elongated flexible strap adapted to wrap around the article to be clamped; an arcuate saddle attached to the inner end of said strap and having a portion adapted to act as a fulcrum, said strap lying under said saddle; and an arcuate clamping arm underlying and supporting said strap having its outer end attached to the outer end of said strap, and its inner end adapted to seat on the fulcrum of said saddle, the radius of curvature of said arm being slightly less than that of the article being clamped, and the length of said arm being more than one-half the circumference of said article, whereby said clamping arm may be rotated inwardly about said fulcrum to draw and frictionally retain said strap over said fulcrum and said arm along the entire length of the latter and about said article being clamped.

EDWIN L. WEBER.

REFERENCES CITED

The following references are of record in the file of this patent:

UNITED STATES PATENTS

| Number | Name | Date |
| --- | --- | --- |
| 1,635,783 | Goodall | July 12, 1927 |
| 1,647,108 | Hadley | Oct. 25, 1927 |
| 1,806,867 | Welsh | May 26, 1931 |

FOREIGN PATENTS

| Number | Country | Date |
| --- | --- | --- |
| 121,461 | Switzerland | July 1, 1927 |
| 499,615 | Great Britain | Jan. 26, 1939 |
| 666,803 | France | Oct. 7, 1929 |